May 11, 1965   W. WAHLI ETAL   3,182,908
CONTROL DEVICE
Filed Nov. 27, 1962   2 Sheets-Sheet 1
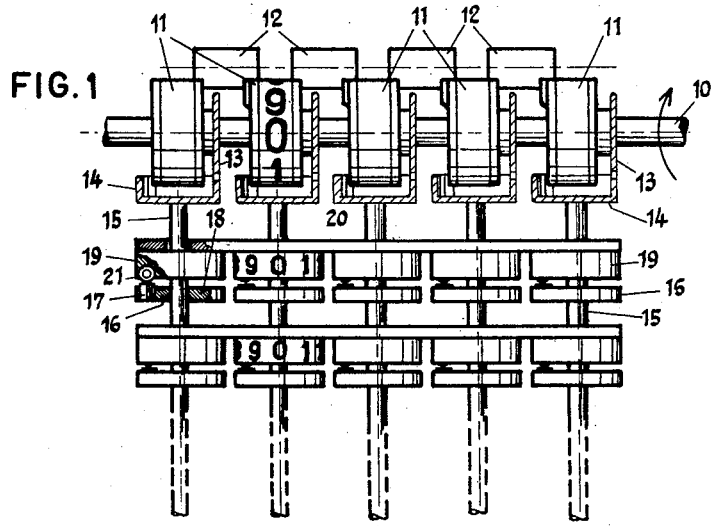
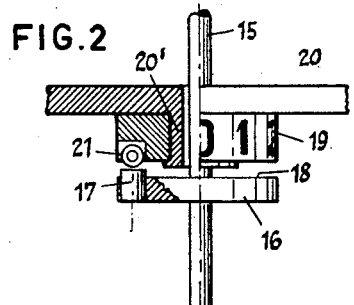
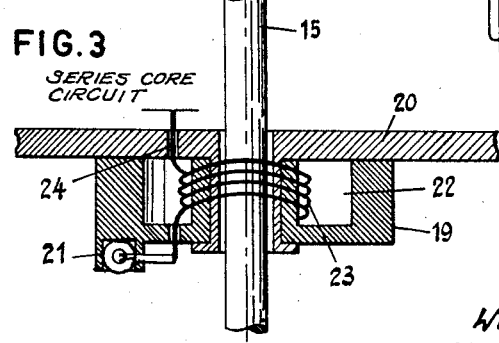
Inventors
Werner Wahli
Hans-Jakob Rey
by Michael J. Striker
Atty

United States Patent Office 3,182,908
Patented May 11, 1965

3,182,908
CONTROL DEVICE
Werner Wahli, Bern-Buempliz, and Hans-Jakob Rey, Bern, Switzerland, assignors to W. Wahli AG, Bern-Buempliz, Switzerland, a corporation of Switzerland
Filed Nov. 27, 1962, Ser. No. 240,386
Claims priority, application Switzerland, Nov. 30, 1961, 13,933/61
14 Claims. (Cl. 235—132)

This invention relates to control devices having a revolution counter with means for actuating a control at a preselected number in addition to presenting the number at any given moment of operation. Mechanical revolution counters, electro-magnetic impulse counters and fully-electronically operated counters are already known.

With mechanically operated revolution counters, the maximum attainable counting speed is limited by the mechanical operation. They do provide a positive and reliable count, coupled with simple construction. Purely mechanically operated selection is known and can be easily carried out structurally, whilst the manifold selection entails structural difficulties.

With electro-magnetic impulse counters the numeral rolls of the counter are further operated continuously by an electro-magnet energised by the impulses to be counted so that an impulse sending switch is required. Non-positive counting may lead to a wrong count if the impulse sending switch fails to make proper connection. The advantage of remote control counting is possible with the electrical equipment, but mechanically the maximum attainable counting speed is limited, while the difficulty of obtaining pre-selection is the same as with mechanical counters.

In the fully electronically operated counters the absence of moving parts enables extremely high speeds to be attained. The electronic components are however costly, and moreover the counting speed is unnecessarily high for many technical uses, while counting is not positive, and is thus dependent on the reliability of the impulse sending switch. On the other hand there are unlimited facilities for switching on pre-selective devices in synchronisation.

The main object of the present invention is to provide such a control device which combines the reliability and simplicity of mechanically operated revolution counters with the ability to provide improved electronic selection. In this construction the mechanical part is devised to enable the revolutions to be counted and to indicate the number at any given time, whilst the electronic part is for recording the pre-selected figure value and fixing magneto-statically and giving a control signal respectively, as soon as the figure coincides with the pre-selected value.

According to the invention this aim is reached by a control device having a rotary counter with a pre-selector comprising in combination with each numeral roller of said counter a permanent magnet and at least one member of an electric circuit, which member is capable of being magneto-statically influenced by said magnet, for the purpose of magneto-static co-operation, whereby on the one hand the permanent magnet is positively connected in rotation to the relative counter numeral roller for the counting operation and is arranged at a distance from its axis of rotation, and on the other hand the desired numeral is pre-selected by allocating said member to this numeral.

In order that the invention may be more clearly understood, an embodiment in accordance therewith will now be described by way of example with reference to the accompanying drawings, in which:

FIG. 1 is an elevation of a revolution counter with two adjusting groups, one for each pre-selection;

FIGS. 2 and 3 each show a detail of a pre-selection group partly in cross section;

Figure 4:
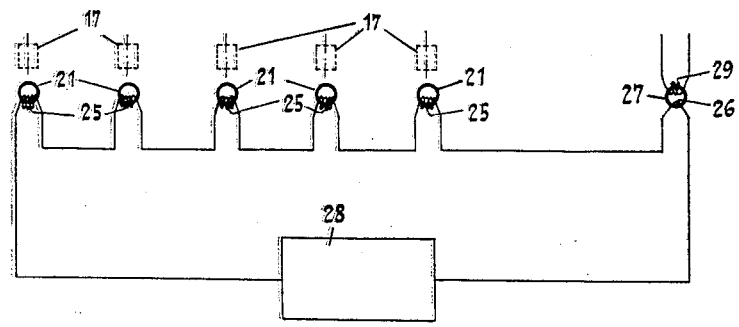
FIG. 4 is a wiring diagram of the coincidence wiring.

Referring to FIG. 1, this shows a revolution counter having five numeral rollers 11 on the counter axle 10. These switch each other on from right to left through continuous switching devices 12 in a conventional manner. A toothed pinion 13 is rotatably fixed to each roller 11 meshing with a toothed crown wheel 14 to drive at the same speed of rotation a shaft 15 perpendicular to the counter axle 10. On the shaft 15 is secured at least one circular disc 16 preferably of synthetic plastic material, into which is inserted a permanent magnet 17, e.g. a ferrite magnet, radially spaced from the axis of rotation of the shaft 15, and which projects from one surface 18 of the disc 16. A pre-selector numeral roller 19 which is arranged facing and spaced by a small gap from the surface 18 of the disc 16, is mounted on a cylindrical projection 20′ of a bearer plate 20 for rotation thereon co-axially to the shaft 15 which freely passes through plate 20 (FIG. 2). Similarly further four cylindrical projections of the plate 20 carry each a pre-selector numeral roller 19 and are each axially traversed by a shaft 15 (FIG. 1). The five pre-selector rollers 19 belong to a first selector group in a row next to each other.

A ferrite annular core 21, provided with a small coil 25 shown only in FIG. 4, is inserted into the surface of the pre-selector roller 19 (FIGS. 2 and 3) facing the surface 18 of the disc 16 so that the magnet 17, rotating with the circular disc 16, passes close to a toroid core 21. The pre-selector roller 19, like the counter-numeral roller 11, carries on its circumference the numerals 0–9 and can be turned in either direction between stops not shown, from 0 to 9 and vice versa, that is to say by no more than one revolution. The connecting wires of the coil of the toroid core 21 may therefore be placed around the roller hub and the shaft 15 in the form of a free spiral 23 in an annular space 22 of the pre-selector roller 19 and pass out through a bore 24 in the plate 20 (FIG. 3) thereby avoiding the necessity of establishing contacts through slip rings.

A second selector group is designed in the same way as the first, and further selector groups may be provided. As the requisite rotatable components in the case of the revolution counter described and the associated selector organs may be of light construction and the relevant permanent magnets very small, it is possible to raise the maximum counting speed of the revolution counter compared to purely mechanically operated known pre-selector counters.

After the desired pre-selected value has been manually adjusted with the pre-selector rollers 19 of the first selector group and remains constantly readable, coincidence will occur whenever the number of the counter numeral rollers 11 coincides exactly with the pre-selected value. This state of coincidence which occurs only momentarily when the counter is running, is fixed by the electric control described hereafter, and causes an electrically operated output signal to be emitted.

In the state of coincidence therefore, a permanent magnet 17 of the circular disc 16 stands in like position facing the toroid core 21 of each pre-selector roller 19 of the first pre-selector group. As may be seen from FIG. 4, the single coils 25 of the toroid cores 21 of each pre-selector group are connected in series to each other and to the coil 26 of a ferrite ring 27, not influenced by the permanent magnets 17, in the circuit of an oscillator 28, which oscillates with a frequency e.g. of 30 kilocycles. The ferrite ring 27 to be designated as a coincidence ring has but few turns compared to those of the coil 25 of the toroid cores 21, and is influenced electromagnetically by the oscillator 28 only when all remaining toroid cores 21 of the first pre-selector group are influenced magneto-statically through coincidence with the associated magnets 17 in order to produce an output signal in a secondary coil 29 of core 27.

If the ferrite rings 21 are each brought within the field of a permanent magnet, local saturation is produced in each of them which brings about considerable alteration in their magnetic behaviour and with it a reduction of inductive reactance in the coil. The tension of the oscillator 28 is then sufficient to reverse the magnetic state of saturation of the coincidence ring 27. If any one of the ferrite rings 21 is unsaturated, the inductive reactance of its coil would be sufficient to prevent the cycling between the two states of saturation of the coincidence ring. The right angular hysteresis of the coincidence ring 27 causes in its secondary coil either a complete output signal or no signal at all, thereby guaranteeing accurate and clear cut responses.

Figure 5:
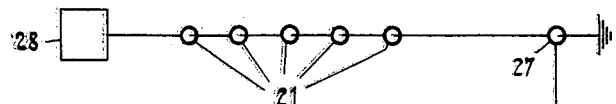
FIG. 5 is a diagram in block of the electronic portion of the revolution counter.

The starting signal arrives from the second coil 29 of the coincidence ring through an amplifier stage 30 at a monostable multivibrator stage 31 arranged in succession, producing a time signal. This signal is independent of the counting speed of the revolution counter or the duration of the state of coincidence and operates, through an amplifier 32, an output relay 33 (FIG. 5) which introduces a pre-determined control operation.

Even when the counting speed of the revolution counter attains 10,000 figures a minute, which is high for a mechanical counter, the state of coincidence persists nevertheless until more than 100 impulses from the generator reach the multivibrator stage, each one of which is capable of initiating the switching of the stage.

In contrast to releases effected by commutator or slip rings, fixing the coincidence magneto-statically and electronically attaining the control signal is effected without friction. Electrical brush contacts are also avoided in the case of pre-selector organs, in contrast to releases effected by decimal stage selector switches. The result is to produce a revolution counter of the type described with maximum insensibility to terminal corrosion and soiling. The number of pre-selector groups is unlimited and calls only for shafts of correspondingly greater length for the circular discs of the permanent magnets. The revolution counter described, is able to count forwards and backwards in contrast to other electronic counters and the electro-magnetic impulse counters.

In a variation of the coincidence switching of a pre-selector group with permanent magnets and ferrite rings, each of the latter may carry two coils separated from each other, the ones being connected in series to the oscillator and the other coils giving off no tension only in the case when coincidence with the associated magnets is present, which situation is electronically recorded and leads to the releasing of an output signal.

As a modification of the types of pre-selector appliance described, one or several pre-selector rollers may be fitted co-axially on each numeral roller of the counter, in succession or on either side of same, which each carry a permanent magnet at a distance from their axis of rotation, inserted into the pre-selector rollers and extending to its circumference. These pre-selector rollers may be adjusted in relation to the numeral roller around their axes of rotation, and the adjustment may take place outside the counting operation. They may be brought into rotary connection with the numeral roller for the counting operation in a positive manner, in order to prevent any alteration of the pre-selected adjustment during operation. Compared to the numerals of the numeral roller, the numerals on the pre-selector rolls are placed along its circumference from 0 to 9 in the opposite direction of rotation. Facing each permanent magnet radially in the concidence position, is arranged a stationary ferrite toroidal core the coil of which is included in series with the coils of the remaining toroid cores belonging to the same pre-selector group, in the circuit of the coincidence switch previously described. In like manner the coils of the toroid cores of each further pre-selector group are related always to a coincidence switching.

Figure 6:
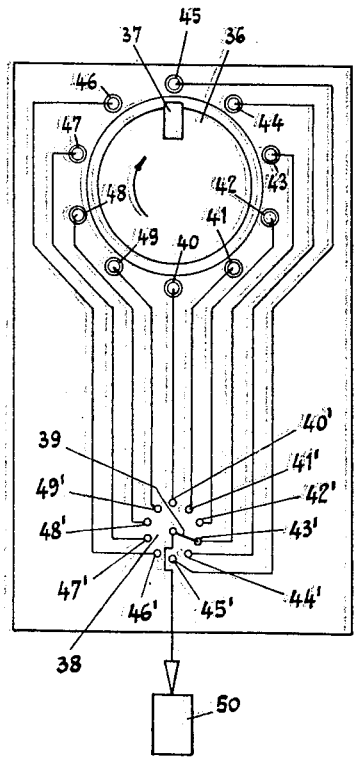
FIG. 6 is a wiring diagram of a modification of invention.

A further possibility consists according to FIG. 6 in fitting a permanent magnet 37 on the circumference of each numeral roller 36 and in co-ordinating ten fixed ferrite rings 40–49 with each numeral roller 36 in such a way that the rotating magnet 37 in each of the ten numeral positions stands exactly above the ferrite ring, e.g. 45, which corresponds to this numeral and in this case will become saturated. This produces a different electric output signal at the output of the coil of the ferrite ring with respect to the unsaturated state of the latter, if the coil is switched to an output circuit. The pre-selection of a certain desired position or numeral of the numeral roller 36 is effected here by means of an electrical stage selector switch 39 which connects the coil of the respective ferrite ring corresponding to the pre-selection, over one of the terminals 40'–49' to the output switch 50 thereby rendering it operative whilst the coils of the remaining ferrite rings are disconnected and remain inoperative.

While we have disclosed embodiments of the present invention, it is to be understood that these embodiments are given by example only and not in a limiting sense, the scope of the invention being determined by the objects and the claims.

What we claim is:

1. A control device having a rotary counter with a pre-selector comprising in combination with each numeral roller of said counter a permanent magnet and at least one member of an electric circuit having a saturable core and only a single coil for said core, said core being adapted to be saturated by said magnet, for the purpose of magneto-static co-operation, whereby on the one hand the permanent magnet is positively connected in rotation to the relative counter numeral roller for the counting operation and is arranged at a distance from its axis of rotation, and on the other hand the desired numeral is pre-selected by allocating said member to this numeral by placing the same in a selected angular position.

2. A device according to claim 1 including a pre-selector means, wherein the member adapted to be saturated is located on said pre-selector means capable of rotating about the axis of rotation of the permanent magnet of the respective numeral roller which pre-selector means is stationary during the counting operation and with its member is adjustable outside the counting operation to the desired numeral, so that on reaching this numeral by the indicating state of the counter numeral roller magneto-static co-operation takes place between the permanent magnet and the member.

3. A device according to claim 1 wherein the axis of rotation of the permanent magnets are arranged at an angle to the axis of rotation of the counter numeral rollers.

4. A device according to claim 1, wherein on each of the rotary axles of the permanent magnets is fitted a same multiple of these magnets and a pre-selector means is co-ordinated with each of said magnets thereby producing pre-selector groups having a pre-selector organ for each numeral roller.

5. A control device having a rotary counter with a pre-selector comprising in combination with each numeral roller of said counter a permanent magnet and at least one ferrite ring adapted to be magneto-statically influenced by said magnet and carrying a single coil of an electric circuit, for the purpose of magneto-static co-operation, whereby on the one hand the permanent magnet is positively connected in rotation to the relative counter numeral roller for the counting operation and is arranged at a distance from its axis of rotation, and on the other hand the ferrite ring is located on a pre-selector organ rotatably adjustable about the axis of rotation of said magnet, the desired numeral being pre-selected by allocating the ferrite ring to this numeral by placing the same in a selected angular position.

6. A device according to claim 5, wherein the pre-selector means is provided with numerals and rotatably positioned on a fixed carrier and has an annular hollow space in which the connecting wires of the coil of the ferrite ring are brought between it and the transition to the carrier in a spiral and guided freely around the bearing position of the pre-selector organ.

7. A device according to claim 5, including an oscillator, wherein the ferrite rings of the pre-selector organs belonging to the same group are connected in series by their coil to said oscillator and to the coil of a ferrite ring which cannot be energised by the permanent magnets and is only then capable of being energised electro-magnetically by the oscillator and capable of inducing an output signal when all remaining ferrite rings of the group are magneto-statically energised by coincidence with the associated magnets.

8. A device according to claim 5, including an oscillator wherein the ferrite rings of the pre-selector means belonging to the same group have two coils separated from each other, one coil being wired in series to the oscillator and the other producing no voltage only when coincidence with the associated magnets is present.

9. A device according to claim 1, wherein the permanent magnet is fitted on to a pre-selector means which is capable of being brought in positive rotary connection with the relative counter numeral roller for the counting operation, whilst the member capable of being saturated is mounted stationary.

10. A device according to claim 1, wherein one or several pre-selector means carrying each a member capable of being magneto-statically influenced are arranged co-axially in succession on each of the counter numeral rollers.

11. A device according to claim 1, wherein the member capable of being saturated is permanently fitted at each possible numeral position of the permanent magnet, whereby the pre-selection of the desired numeral takes place by electric inclusion of the member associated therewith in the control evaluating the magneto-static collaboration.

12. In combination with a number wheel; a magnet connected to said number wheel for rotation spaced from the axis of the same; pre-selector means including a core turnable about said axis between number positions for selecting a number and passed by said magnet in each number position during rotation of said magnet and to be saturated by the same, and a coil on said core; and circuit means connected with said coil for producing a control signal upon saturation of said core by said magnet.

13. In combination with a number wheel; a magnet connected to said number wheel for rotation spaced from the axis of the same; pre-selector means including a core turnable about said axis between number positions for selecting a number and passed by said magnet in each number position during rotation of said magnet and to be saturated by the same, and a coil on said core; and circuit means including another core, a coil on said other core connected in series with said first-mentioned coil, an oscillator connected with said coils, and a secondary coil on said other core for producing an output signal when said magnet passes said core of said pre-selector means and saturates the same.

14. In combination with a plurality of number wheels; a magnet connected to each number wheel for rotation and being spaced from the axis of the same; pre-selector means including a plurality of cores respectively turnable about said axes of said number wheels between a plurality of number positions for selecting a number, each of said cores being passed by a correlated magnet in the respective number position during rotation of said magnet with said number wheels and adapted to be saturated by the same, and a coil on each core; and circuit means including another core, a coil on said other core connected in series with said pre-selector coils, an oscillator connected in series with said pre-selector coils and with said other coil, and secondary coil on said other core for producing an output signal when said magnets pass said correlated pre-selector cores and saturate all said pre-selector cores.

References Cited by the Examiner
UNITED STATES PATENTS 2,740,110  3/56  Trimble _____ 340—364
3,078,037  2/63  Finzi _____ 235—132

LEO SMILOW, *Primary Examiner.*